(12) United States Patent
Nagahari

(10) Patent No.: US 10,695,974 B2
(45) Date of Patent: Jun. 30, 2020

(54) THREE-DIMENSIONAL OBJECT SHAPING METHOD AND THREE-DIMENSIONAL OBJECT SHAPING DEVICE

(71) Applicant: MIMAKI ENGINEERING CO., LTD., Nagano (JP)

(72) Inventor: Masaya Nagahari, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 350 days.

(21) Appl. No.: 15/655,903

(22) Filed: Jul. 21, 2017

(65) Prior Publication Data

US 2018/0022021 A1    Jan. 25, 2018

(30) Foreign Application Priority Data

Jul. 21, 2016   (JP) .................................. 2016-143685

(51) Int. Cl.
| | | |
|---|---|---|
| *B29C 64/112* | (2017.01) | |
| *B29C 64/205* | (2017.01) | |
| *B33Y 10/00* | (2015.01) | |
| *B33Y 30/00* | (2015.01) | |
| *B33Y 50/02* | (2015.01) | |
| *B29C 64/393* | (2017.01) | |

(52) U.S. Cl.
CPC .......... *B29C 64/112* (2017.08); *B29C 64/205* (2017.08); *B29C 64/393* (2017.08); *B33Y 10/00* (2014.12); *B33Y 30/00* (2014.12); *B33Y 50/02* (2014.12)

(58) Field of Classification Search
CPC .................................................... B29C 64/112
See application file for complete search history.

(56) References Cited

U.S. PATENT DOCUMENTS

2016/0151980 A1* 6/2016 Hatanaka ........... H04N 1/00827
                                                                    700/98

FOREIGN PATENT DOCUMENTS

| JP | 2000101837 | 4/2000 |
|---|---|---|
| JP | 2001-18297 | 1/2001 |
| JP | 2010016446 | 1/2010 |
| JP | 2016107406 | 6/2016 |
| JP | 2017113986 | 6/2017 |

OTHER PUBLICATIONS

"Office Action of Japan Counterpart Application," with English translation thereof, dated Jul. 30, 2019, p. 1-p. 8.

* cited by examiner

*Primary Examiner* — Larry W Thrower
(74) *Attorney, Agent, or Firm* — JCIPRNET

(57) ABSTRACT

A three-dimensional object shaping method for shaping a three-dimensional object by layering a unit layer formed using a colored ink of one or more colors, the method including a slice information calculating process of calculating a plurality of pieces of cross-sectional slice information from three-dimensional data including color data, a halftone processing process of carrying out a halftone process using a dither matrix on at least one part of the color data with respect to each layer of the plurality of pieces of cross-sectional slice information and carrying out the halftone process so that a pattern of the dither matrix used with respect to at least two of the plurality of pieces of cross-sectional slice information differs, and a unit layer forming process of forming the unit layer based on the cross-sectional slice information subjected to the halftone process.

11 Claims, 16 Drawing Sheets ated in Japanese
THREE-DIMENSIONAL OBJECT SHAPING METHOD AND THREE-DIMENSIONAL OBJECT SHAPING DEVICE

CROSS REFERENCE TO RELATED APPLICATIONS

This application claims the priority benefit of Japanese Patent Application No. 2016-143685, filed on Jul. 21, 2016. The entirety of the above-mentioned patent application is hereby incorporated by reference herein and made a part of this specification.

TECHNICAL FIELD

The present disclosure relates to a three-dimensional object shaping method and a three-dimensional object shaping device.

DESCRIPTION OF THE BACKGROUND ART

In recent years, use of a three-dimensional printer that shapes a three-dimensional object having a three-dimensional shape has started increasing in various applications. In such a three-dimensional printer, the three-dimensional object can be shaped by layering a shaping material such as a discharged ink. For example, a color three-dimensional model forming device described in Japanese Unexamined Patent Publication No. 2001-18297 sectionalizes three-dimensional data configured by shape data for specifying a shape of a three-dimensional object and surface image data indicating an image of a surface to a plurality of layers, performs a halftone process (error diffusion, FM screening, AM screening) on the surface image data of each layer, and specifies the color of each pixel of the surface image data of each layer. The shaping material of a specified color is discharged from a discharging portion in order from a lowermost layer, and then cured and layered to shape a three-dimensional object complying with the three-dimensional data. This type of three-dimensional printer includes, for example, an inkjet type discharging portion for each color to discharge the ink serving as the shaping material such as yellow, magenta, cyan, black, and clear.

SUMMARY

However, in the color three-dimensional model forming device described above, a so-called dithering process is carried out with respect to each layer, in which the three-dimensional data is sectionalized to a plurality of layers, and thus each layer is layered with the array of color being the same array in each layer. Thus, the colored color easily stands out, whereby the surface image quality of the three-dimensional object may be formed different from the three-dimensional data; for example, a continuous stripe such as a vertical stripe may be formed.

In light of the foregoing, the present disclosure provides a three-dimensional object shaping method and a three-dimensional object shaping device capable of bringing the surface image quality of the three-dimensional object closer to the three-dimensional data.

In order to solve the problem and achieve the objective, a three-dimensional object shaping method according to the present disclosure relates to a three-dimensional object shaping method for shaping a three-dimensional object by layering a unit layer formed using a coloring material of one or more colors; the three-dimensional object shaping method including a slice information calculating process of calculating a plurality of pieces of cross-sectional slice information from three-dimensional data including color data; a halftone processing process of carrying out a halftone process using a dither matrix on at least one part of the color data with respect to each layer of the plurality of pieces of cross-sectional slice information, and carrying out the halftone process so that a pattern of the dither matrix used with respect to at least two of the plurality of pieces of cross-sectional slice info nation differs; and a unit layer forming process of forming the unit layer based on the cross-sectional slice information subjected to the halftone process.

In the present disclosure, at least two or more different patterns are applied to a plurality of dither matrixes with respect to the plurality of pieces of cross-sectional slice information, and thus the arrangement position of an arbitrary coloring material can be dispersed at the time of layering the unit layer formed using the coloring material. Thus, a specific color can be suppressed from needlessly standing out, and the surface image quality of the three-dimensional object formed using the coloring material can be enhanced to the same extent as the two-dimensional printed matter. As a result, the surface image quality of the three-dimensional object can be brought closer to the three-dimensional data.

According to the three-dimensional object shaping method, in the halftone processing process, the halftone process is preferably carried out so that patterns of the dither matrix used for the adjacent cross-sectional slice information of the plurality of pieces of cross-sectional slice information are different.

In the present disclosure, the halftone process is carried out such that the patterns of the dither matrixes used for the adjacent cross-sectional slice information are different, and hence the coloring material of the same color can be more reliably prevented from being successively arranged at the same position at the time of forming the unit layer. As a result, the surface image quality of the three-dimensional object can be more reliably enhanced.

In the three-dimensional object shaping method, preferably, the plurality of pieces of cross-sectional slice information include position information corresponding to a position in a layering direction of the unit layer; the dither matrix is configured of a matrix of two axes; the dither matrix includes a reference matrix having a reference pattern to become a reference of the pattern of the dither matrix, and a deformed matrix having a deformed pattern formed by parallel-moving a pattern position by a predetermined amount in at least one axis direction of the two axes with respect to the reference pattern; and the deformed matrix has the predetermined amount determined according to the position information.

In the present disclosure, the pattern of the dither matrix is parallel-moved by a predetermined amount with respect to the reference pattern according to the position in the layering direction of the unit layer to generate the deformed matrix, and hence the arrangement position of the coloring material of the same color can be efficiently dispersed in the successive unit layers. As a result, the surface image quality of the three-dimensional object can be more reliably enhanced.

In the three-dimensional object shaping method, the color data preferably includes information on a density of a color; and in the halftone processing process, the halftone process is preferably carried out on the color data in which a density of a color is the lowest of the color data.

In the present disclosure, the halftone process is carried out on the color data in which the density of the color is the lowest, and thus the effect of enhancing the surface image quality of the three-dimensional object can be enhanced. That is, in the case of a color with low density, the number of coloring materials of the relevant color reduces, and hence the granular feeling of the relevant color may stand out when the coloring material is arranged at the same position at the time of discharging the coloring material. Thus, the effect of enhancing the surface image quality of the three-dimensional object can be enhanced by carrying out the halftone process on the color data of low density.

A three-dimensional object shaping device according to the present disclosure relates to a three-dimensional object shaping device that shapes a three-dimensional object by layering a unit layer formed using a coloring material of one or more colors based on three-dimensional data including color data, the three-dimensional object shaping device including a discharger for discharging a liquid droplet to a working surface, the discharger including a plurality of nozzles that discharge a liquid droplet for shaping the three-dimensional object; a relative mover for relatively moving the discharger and the working surface in at least one of a main scanning direction or a sub-scanning direction; and a control device for controlling operations of the discharger and the relative mover. In this three-dimensional object shaping device, the control device calculates a plurality of pieces of cross-sectional slice information to use for formation of the unit layer based on the three-dimensional data, carries out a halftone process using a dither matrix on at least one part of the color data with respect to each layer of the plurality of pieces of cross-sectional slice information, carries out the halftone process of the color data so that a pattern of the dither matrix used with respect to at least two of the plurality of pieces of cross-sectional slice information differs, and controls the discharger and the relative mover to form the unit layer based on the cross-sectional slice information subjected to the halftone process.

In the present disclosure, at least two or more different patterns are applied to a plurality of dither matrixes with respect to the plurality of pieces of cross-sectional slice information, and thus the arrangement position of an arbitrary coloring material can be dispersed at the time of forming and layering the unit layer. Thus, the specific color can be suppressed from standing out, and the surface image quality of the three-dimensional object can be enhanced to the same extent as the two-dimensional printed matter. As a result, the surface image quality of the three-dimensional object can be brought closer to the three-dimensional data.

A three-dimensional object shaping method and a three-dimensional object shaping device according to the present disclosure have an effect of being able to bring the surface image quality of the three-dimensional object closer to the three-dimensional data.

DETAILED DESCRIPTION OF EMBODIMENTS

Hereinafter, an embodiment of a three-dimensional object shaping method and a three-dimensional object shaping device according to the present disclosure will be described in detail based on the drawings. The present disclosure is not to be limited by such an embodiment. Components in the following embodiment include components that can be replaced by those skilled in the art and are easy, or are substantially the same.

Embodiment

Figure 1:
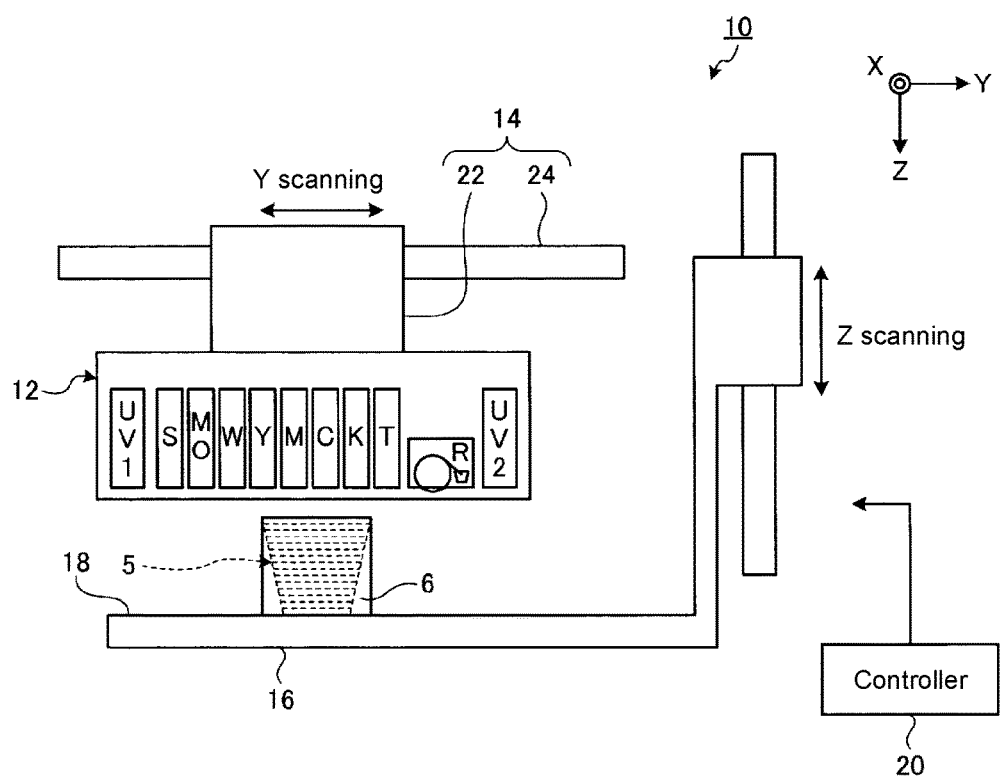
FIG. 1 is a schematic view of a three-dimensional object shaping device according to an embodiment.
Figure 2:
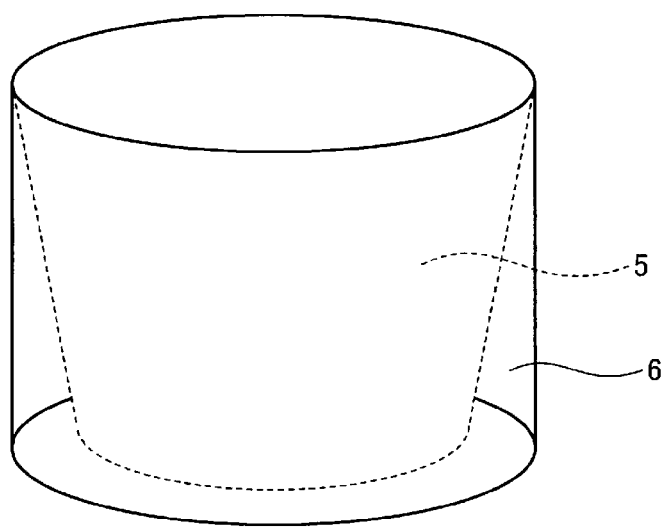
FIG. 2 is a perspective view showing one example of a three-dimensional object shaped by the three-dimensional object shaping device shown in FIG. 1.

FIG. 1 is a schematic view of a three-dimensional object shaping device according to an embodiment. FIG. 2 is a perspective view showing one example of a three-dimensional object shaped by the three-dimensional object shaping device shown in FIG. 1. A three-dimensional object shaping device 10 shown in FIG. 1 is a device that shapes a three-dimensional object 5 having by a three-dimensional shape through a layering shaping method. In this case, the layering shaping method is, for example, a method of overlapping a plurality of layers to shape the three-dimensional object 5. The three-dimensional object 5 is, for example, a three-dimensional structural object. The three-dimensional object shaping device method executed in the three-dimensional object shaping device 10 may be, for example, a color shaping method of shaping the three-dimensional structural object through the layering method from the shape information and the color image information of the three-dimensional structural object.

Excluding the points described below, the three-dimensional object shaping device 10 may have a configuration same as or similar to the known three-dimensional object shaping device. The three-dimensional object shaping device 10 may be, for example, a device in which one part of a configuration of an inkjet printer, which is a known printing device on a plane, is modified. For example, the three-dimensional object shaping device 10 may be a device in which one part of an inkjet printer using an ultraviolet curing type ink (UV ink) is modified.

The three-dimensional object shaping device 10 according to the present embodiment includes a discharger 12, a main scanning driver 14, a shaping table 16 being a mounting table for mounting the three-dimensional object 5, and a controller 20. The discharger 12 is a portion that discharges a liquid droplet to become the material of the three-dimensional object 5, and this unit discharges a liquid droplet or the like of curable resin, which is a resin that cures according to a predetermined condition, and cures the same to form each layer configuring the three-dimensional object 5. More specifically, the discharger 12, for example, discharges the liquid droplet in response to an instruction of the controller 20 to repeatedly carry out, over a plurality of times, a layer forming operation of forming a layer of curable resin, and a curing operation of curing the layer of curable resin formed in the layer forming operation. The discharger 12 repeatedly carries out such operations to overlap and form a plurality of layers of cured curable resin.

An ultraviolet curing type resin that cures by irradiation of an ultraviolet ray, for example, is used for the curable resin discharged from the discharger 12. In this case, the discharger 12 discharges, for example, an ink droplet of an ultraviolet curing type ink for the liquid droplet to become the material of the three-dimensional object 5. In the curing operation, the layer of curable resin is cured by irradiating with the ultraviolet ray from the ultraviolet light source. In this case, the layer of curable resin is the ultraviolet curing type ink.

In the three-dimensional object shaping device 10 according to the present embodiment, the discharger 12 is arranged as a discharging portion that discharges the ink for shaping the three-dimensional object 5 onto a working surface 18 located on an upper surface of the shaping table 16. That is, the discharger 12 carries out coloring with respect to the surface of the three-dimensional object 5 by discharging an ink droplet of a colored (transparent or opaque) ultraviolet curing type ink to shape the colored three-dimensional object 5. The discharger 12 forms a support 6 at a periphery of the three-dimensional object 5, as shown in FIG. 2, at the time of shaping of the three-dimensional object 5. The support 6 is a layered structural object (support layer) for supporting the three-dimensional object 5 being shaped, and is dissolved and removed by water and the like after the shaping of the three-dimensional object 5 is completed. A more specific configuration and operation of the discharger 12 will be described later in further detail.

The main scanning driver 14 is a driving unit that causes the discharger 12 to carry out the main scanning operation, and is arranged as a relative mover for relatively moving the discharger 12 and the working surface 18 by causing the discharger 12 to carry out the main scanning operation. Causing the discharger 12 to carry out the main scanning operation in the present embodiment means, for example, causing the inkjet head of the discharger 12 to carry out the main scanning operation. The main scanning operation is, for example, an operation of discharging the ink droplet while moving in the main scanning direction (Y direction in the figure) set in advance.

The main scanning driver 14 includes a carriage 22 and a guide rail 24. The carriage 22 is a holding portion that holds the discharger 12 such that the discharger 12 faces the working surface 18 of the shaping table 16. In other words, the carriage 22 holds the discharger 12 such that the discharging direction of the ink droplet discharged from the discharger 12 becomes a direction directed toward the working surface 18. At the time of the main scanning operation, the carriage 22 is moved along the guide rail 24 while holding the discharger 12. The guide rail 24 is a rail member that guides the movement of the carriage 22, and moves the carriage 22 in response to the instruction of the controller 20 at the time of the main scanning operation.

The movement of the discharger 12 at the time of the main scanning operation may be a relative movement with respect to the three-dimensional object 5. Thus, in a modified example of the configuration of the three-dimensional object shaping device 10, for example, the three-dimensional object 5 side may be moved by fixing the position of the discharger 12 and moving the shaping table 16.

The shaping table 16 is a mounting table for mounting the three-dimensional object 5 being shaped on the working surface 18 of the upper surface. The shaping table 16 has a function of moving the upper surface in an up and down direction (Z direction in the figure), and moves the upper surface in accordance with the advancement in the shaping of the three-dimensional object 5 in response to the instruction of the controller 20. Thus, a distance (gap) between a surface-to-be-shaped in the three-dimensional object 5 in the middle of shaping and the discharger 12 thus can be appropriately adjusted. The surface-to-be-shaped of the three-dimensional object 5 in this case is the surface where the next layer by the discharger 12 is formed. The scanning in the Z direction of moving the shaping table 16 up and down with respect to the discharger 12 may be carried out by moving the discharger 12 side.

The controller 20 is a control device that performs control of each unit of the three-dimensional object shaping device 10 such as control of the operations of the discharger 12 and the main scanning driver 14, and includes a CPU (Central Processing Unit) functioning as a controller for executing various types of processes, a RAM (Random Access Memory) functioning as a memory for storing various types of information, a ROM (Read Only Memory), and the like. The controller 20 carries out the control of the operation for shaping the three-dimensional object 5 by controlling each unit of the three-dimensional object shaping device 10 based on the shape information, the color image information, and the like of the three-dimensional object 5 to be shaped.

The three-dimensional object shaping device 10 may further include various types of configurations necessary for shaping, coloring, and the like of the three-dimensional object 5. For example, the three-dimensional object shaping device 10 may include a sub-scanning driver that causes the discharger 12 to carry out the sub-scanning operation. In this case, the sub-scanning operation is, for example, an operation of relatively moving the inkjet head in the discharger 12 in the sub-scanning direction (X direction in the figure) orthogonal to the main scanning direction with respect to the three-dimensional object 5 being shaped. The sub-scanning driver causes the discharger 12 to carry out the sub-scanning operation, as necessary, in order to, for example, shape the three-dimensional object 5 in which the length in the sub-scanning direction is longer than a shaping width of the inkjet head in the discharger 12. More specifically, the sub-scanning driver may be a driving unit for moving the shaping table 16 in the sub-scanning direction, or may be a driving unit for moving the guide rail 24 in the sub-scanning direction with the carriage 22 holding the discharger 12.

Figure 3:
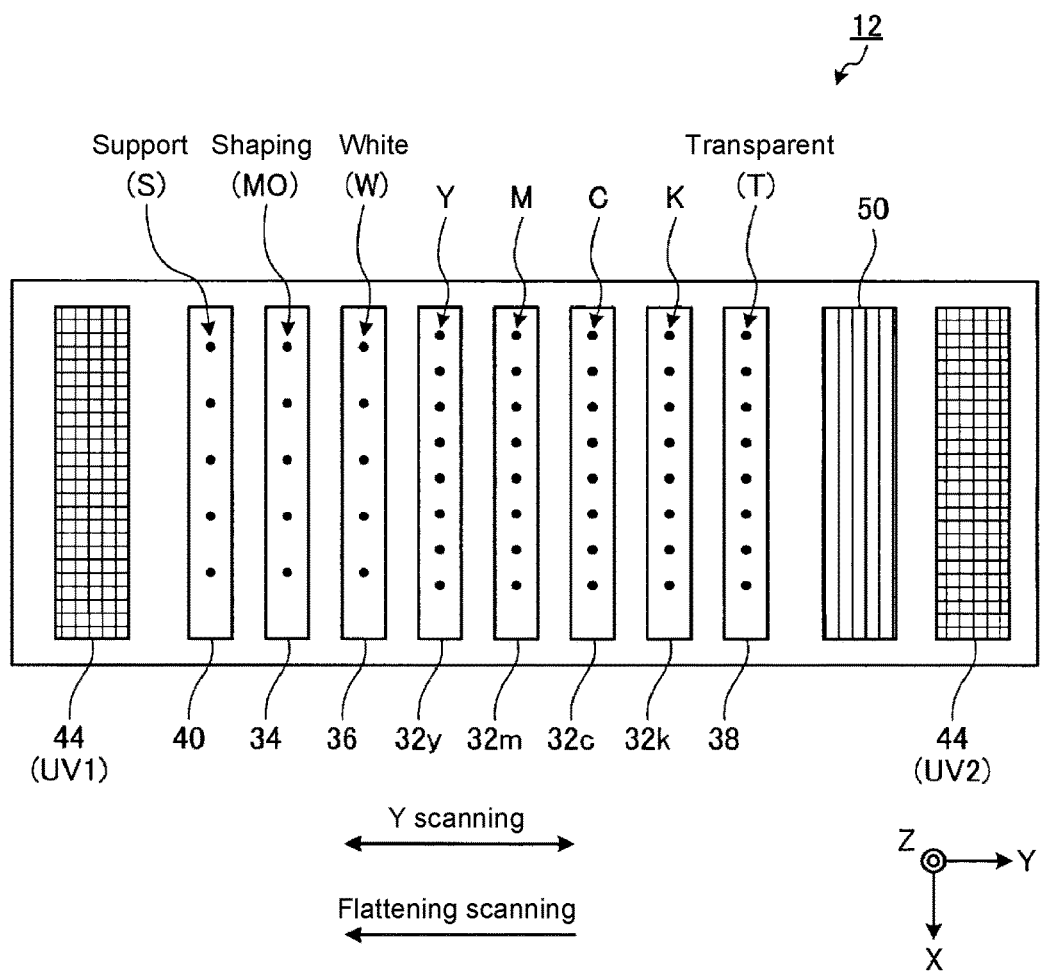
FIG. 3 is an explanatory view of the discharger seen from the discharging surface side of the ink droplet.

FIG. 3 is an explanatory view of the discharger seen from the discharging surface side of the ink droplet. The discharger 12 includes a plurality of colored ink heads 32y, 32m, 32c, 32k (hereinafter described as plurality of colored ink heads 32y to 32k), a white ink head 36, a clear ink head 38, a shaping material head 34, a support material head 40, a plurality of ultraviolet light sources 44, and a flattening roller 50.

The colored ink heads 32y to 32k, the white ink head 36, the clear ink bead 38, and the shaping material head 34 are discharging heads, which are discharging means, for discharging the liquid droplet of the curable resin through the inkjet method. Such colored ink heads 32y to 32k, the white link head 36, the clear ink head 38, and the shaping material head 34 are inkjet heads that discharge the ink droplet of the ultraviolet curing type ink, and are arranged lined in the main scanning direction (Y direction) with the positions in the sub-scanning direction (X direction) aligned.

The colored ink heads 32y to 32k are inkjet heads that respectively discharges the ink droplet of the colored ink used as the coloring material of a color different from each other. The colored ink heads 32y to 32k can discharge the ink droplet of the ultraviolet curing type ink of each color of yellow (Y), magenta (M), cyan (C), and black (K). The white ink head 36 is an inkjet head that discharges the ink droplet of the white (W) ultraviolet curing type ink. The coloring material is constituted from a plurality of coloring materials having different colors.

The clear ink head 38 is an inkjet head that discharges an ink droplet of a clear ink, which is an ultraviolet curing type transparent material. The clear ink is an ink of a clear color, which is a transparent color (T), and is a colorless transparent ink. The clear ink is an ink containing an ultraviolet curing type resin and not containing a coloring material.

The shaping material head 34 is an inkjet head that discharges an ink droplet of an ultraviolet curing type ink used for the shaping material having fluidity for forming the three-dimensional object 5. The shaping material head 34 can discharge the ink droplet of a shaping ink (MO) of a predetermined color. The clear ink, which is a transparent material, for example, is used for the shaping ink.

The support material head 40 is an inkjet head that discharges the ink droplet containing the material (S) of the support 6 (see FIG. 2). A water soluble material that can be dissolved in water after the shaping of the three-dimensional object 5 is preferably used for the material of the support 6 in this case. A known material for the support 6 may be appropriately used for the material of the support 6. The support material head 40 is arranged lined in the main scanning direction with the position in the sub-scanning direction aligned with respect to the colored ink heads 32y to 32k, the white ink head 36, the clear ink head 38, and the shaping material head 34.

A known inkjet head, for example, can be suitably used for the colored ink heads 32y to 32k, the white ink head 36, the shaping material head 34, and the support material head 40. Such inkjet heads include a nozzle row, in which a plurality of nozzles are lined in the sub-scanning direction, on a surface facing the working surface 18 (see FIG. 1) in the shaping table 16. In this case, the arrangement direction of the nozzle row in the respective inkjet heads is the same as and parallel to each other. Furthermore, at the time of the main scanning operation, the inkjet head discharges the ink droplet in the Z direction while moving in the main scanning direction orthogonal to the direction in which the nozzles are lined.

The plurality of ultraviolet light sources 44 are light sources of an ultraviolet ray for curing the ultraviolet curing type ink, and an ultraviolet LED (Light Emitting Diode), a metal halide lamp, a mercury lamp, and the like can be used. Each of the plurality of ultraviolet light sources 44 is arranged on one end side and the other end side in the main scanning direction of the discharger 12 so as to have the colored ink heads 32y to 32k, the white ink head 36, the clear ink head 38, the shaping material head 34, and the support material head 40 in between. In the three-dimensional object shaping device 10 of the present embodiment, UV1 and UV2 are arranged as the ultraviolet light source 44, where the UV1 is arranged on one end side of the discharger 12 in the main scanning direction (Y direction), and the UV2 is arranged on the other end side of the discharger 12 in the main scanning direction (Y direction).

The flattening roller 50 has a configuration of flattening the layer of the ultraviolet curing type ink formed during the shaping of the three-dimensional object 5. The flattening roller 50 is arranged between the arrangement of the colored ink heads 32y to 32k, the white ink head 36, the clear ink head 38, the shaping material head 34, and the support material head 40, and the UV2, which is the ultraviolet light source 44 arranged on the other end side of the discharger 12. Thus, the flattening roller 50 is arranged lined in the main scanning direction with the position in the sub-scanning direction aligned with respect to the colored ink heads 32y to 32k, the white ink head 36, the clear ink head 38, the shaping material head 34, and the support material head 40. The flattening roller 50 is arranged on the discharger 12 so as to be movable in the up and down direction with respect to the discharger 12.

Figure 4:
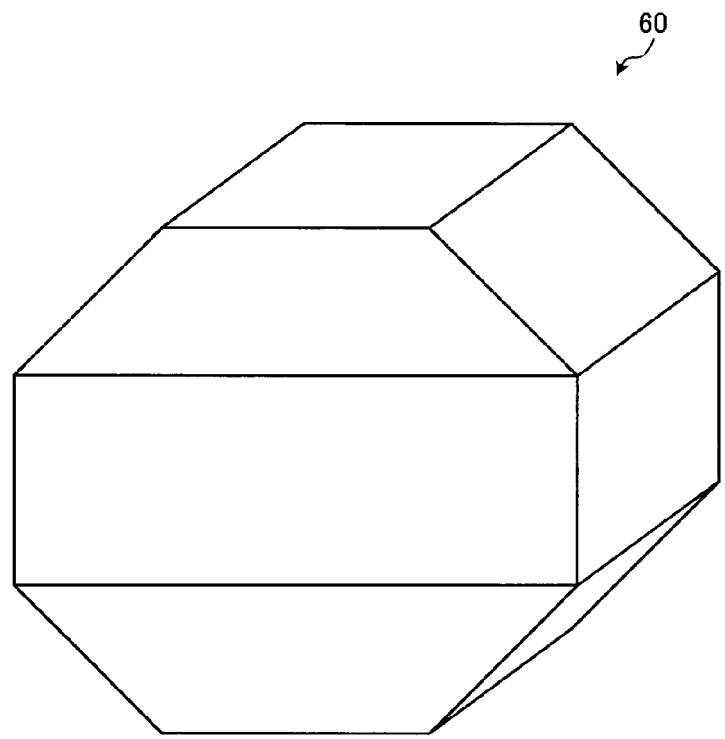
FIG. 4 is an explanatory view of three-dimensional data used for the shaping of the three-dimensional object.

The three-dimensional object shaping device 10 according to the present embodiment has the above configuration, and the effects thereof will be described below. FIG. 4 is an explanatory view of the three-dimensional data used for the shaping of the three-dimensional object. When shaping the three-dimensional object 5 with the three-dimensional object shaping device 10, the shaping of the three-dimensional object 5 is carried out on the shaping table 16 by acquiring the three-dimensional data 60, which is data for shaping the three-dimensional object 5, with the controller 20 from an external device (not illustrated) such as a personal computer, and by controlling the discharger 12 by the controller 20 based on the three-dimensional data 60. The three-dimensional data 60 used for the shaping of the three-dimensional object 5 includes shape data for specifying the shape of the three-dimensional object 5, and color data of each portion of the three-dimensional object 5. Thus, at the time of carrying out the shaping of the three-dimensional object 5 by the discharger 12, a layer is formed in the Z direction by discharging the ink droplet from each inkjet head based on the shape data and the color data of the three-dimensional data 60. Furthermore, at the time of layering in the Z direction by discharging the ink droplet, the shaping is performed while the flattening of each layer is being repeated by the flattening roller 50 before curing the ink droplet discharged on each layer.

Specifically, when discharging the ink droplet from each inkjet head of the discharger 12, the controller 20 controls the main scanning driver 14 to move the carriage 22 in the main scanning direction (Y direction) along the guide rail 24 so that the discharger 12 discharges ink while being moved in the main scanning direction. Furthermore, since each inkjet head includes a nozzle row in which a plurality of nozzles are lined in the sub-scanning direction, while the discharger 12 is being moved, the ink droplet is discharged to the position where the ink droplet is to be discharged in the main scanning direction and the sub-scanning direction by discharging the ink droplet from the nozzle located at the position in the sub-scanning direction defined in the data at the position in the main scanning direction defined in the data for shaping.

The colored ink heads 32$y$ to 32$k$, the white ink head 36, the clear ink head 38, the shaping material head 34, and the support material head 40 are arranged for the inkjet heads of the discharger 12, where the colored ink heads 32$y$ to 32$k$ discharge the colored ink droplets to use for the coloring of the three-dimensional object 5. The data for shaping includes data related to the coloring of the three-dimensional object 5, and the colored ink heads 32$y$ to 32$k$ discharge the colored ink droplet based on such data.

The shaping material head 34 discharges the ink droplet used as the shaping material to become the basis for forming the three-dimensional object 5. The shaping material head 34 discharges the ink droplet to use as the shaping material based on the data for shaping to form the shape of the three-dimensional object 5 in the respective layers for each layer. In this case, the ink droplet of each color is discharged from the colored ink heads 32$y$ to 32$k$, the white ink head 36, and the clear ink head 38 to form each layer formed by the shaping material with the color based on the data for shaping.

Furthermore, the support material head 40 discharges the ink droplet to become the material of the support 6 (see FIG. 2) to the portion other than the portion of forming the three-dimensional object 5 in each layer to form the three-dimensional object 5 at high precision irrespective of the shape of the three-dimensional object 5. Thus, the shape of the three-dimensional object 5 is held by the ink droplet to become the material of the support 6 even before the ink is cured in each layer.

The controller 20 discharges the ink droplet in such manner for each layer based on the three-dimensional data 60 while moving the discharger 12 in the main scanning direction, and irradiates the ultraviolet ray from the ultraviolet light source 44 to cure the ink. After forming one layer in such manner, the shaping table 16 is moved in the Z direction by the thickness of one layer in the direction in which the shaping table 16 moves away from the discharger 12, and the next layer is formed so as to overlap the cured layer in the Z direction. The three-dimensional object shaping device 10 repeats the above to shape the three-dimensional object 5 having a three-dimensional shape.

In the discharger 12, each layer is formed by the discharged ink while the ink droplet for every inkjet head is being discharged in such manner, but a slight error may occur in the amount of ink droplet discharged from each nozzle arranged in the inkjet head. Thus, in the discharger 12, the ink is discharged with the amount of ink droplet discharged from each nozzle slightly increased and the ink before being cured is scraped off with the flattening roller 50 to form the thickness of one layer to a desired thickness.

Thus, in cases where the shaping of the three-dimensional object 5 is carried out by the three-dimensional object shaping device 10, the desired coloring is carried out on the surface of the three-dimensional object 5 by carrying out the shaping using the colored ink, where in such a case, the three-dimensional object shaping device 10 carries out the representation of an intermediate color using the colored ink of the three-dimensional object shaping device 10. Specifically, the desired color is represented by carrying out dithering in each layer, and the three-dimensional object 5 in which the surface is colored with the desired color is shaped by discharging the ink droplet of an arbitrary colored ink to a position of a dot or a position of a pixel obtained by the dithering.

Figure 5:
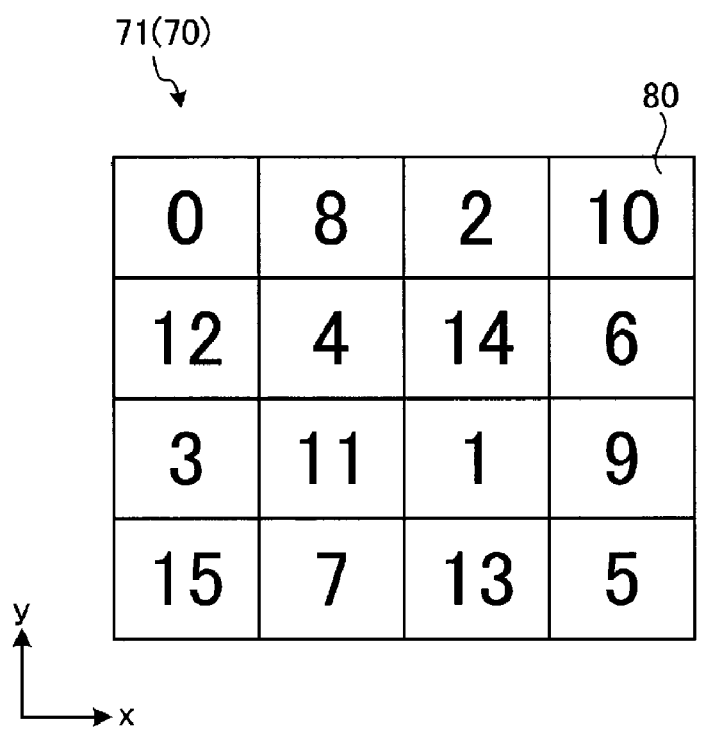
FIG. 5 is an explanatory view of a dither matrix that becomes a base for representing an intermediate color with the three-dimensional object shaping device.

FIG. 5 is an explanatory view of a dither matrix that becomes a base for representing an intermediate color with the three-dimensional object shaping device. When representing the intermediate color with the three-dimensional object shaping device 10, a dither matrix 70 representing the intermediate color by dithering is assumed as a reference, and the data for discharging the ink with the discharger 12 is generated based on the dither matrix 70, thus shaping the three-dimensional object 5 colored with the intermediate color. The dither matrix 70 that acts a reference for representing the intermediate color is a dot matrix configured by a great number of dots 80 lined in a lattice form. The dither matrix 70 is not the color desired to be represented, and is data in which the dot 80 is sparsely colored at a proportion the relevant color can be represented according to the color desired to be represented with respect to the entire dot 80. Thus, the dither matrix 70 is the data that can represent the intermediate color when the dither matrix 70 is viewed as a whole.

In the dither matrix 70, a number to become a reference on whether or not to carry out coloring is given to each dot 80. In cases where the data for discharging the ink is generated based on the dither matrix 70, whether or not to discharge the ink to a position corresponding to the respective dot 80 is determined based on the number. Specifically, the dither matrix 70 includes a matrix of two axes orthogonal to each other, and the dots 80 are lined in the respective direction of the two axes. Furthermore, different numbers are denoted to each dot 80. For example, when the dither matrix 70 includes 4×4 dots 80, the total number of dots 80 is 16, and hence different numbers, 0 to 15, are denoted to such dots 80. Different numbers are appropriately denoted to each dot 80 of the dither matrix 70 through a dither method such as the Bayer type such that a desired color can be represented.

In cases where an arbitrary layer is formed by discharging the ink using the dither matrix 70, a threshold value is set according to the color to represent, and whether or not to discharge the colored ink is determined for every dot 80 by comparing the threshold value and the number of each dot 80. For example, when discharging the colored ink to only the dot 80 denoted with a number greater than or equal to the set threshold value, the colored ink is discharged to only the dot 80 denoted with the number greater than or equal to the threshold value, and the clear ink is discharged to the other dots 80. The arbitrary layer is thereby formed while representing the intermediate color using the dither matrix 70.

Furthermore, in the three-dimensional object shaping method according to the present embodiment, an arrangement pattern of the numbers denoted to the dots 80 is differed in the dither matrix 70 corresponding to an adjacent layer. That is, the three-dimensional object shaping method according to the present embodiment utilizes a reference matrix 71 having a reference pattern to become a reference of the patterns of the dither matrix 70, and a deformed matrix 72 (see FIGS. 6 and 7) having a deformed pattern formed by parallel-moving a pattern position by a predetermined amount in at least one axis direction of the two axes with respect to the reference pattern.

Figure 6:
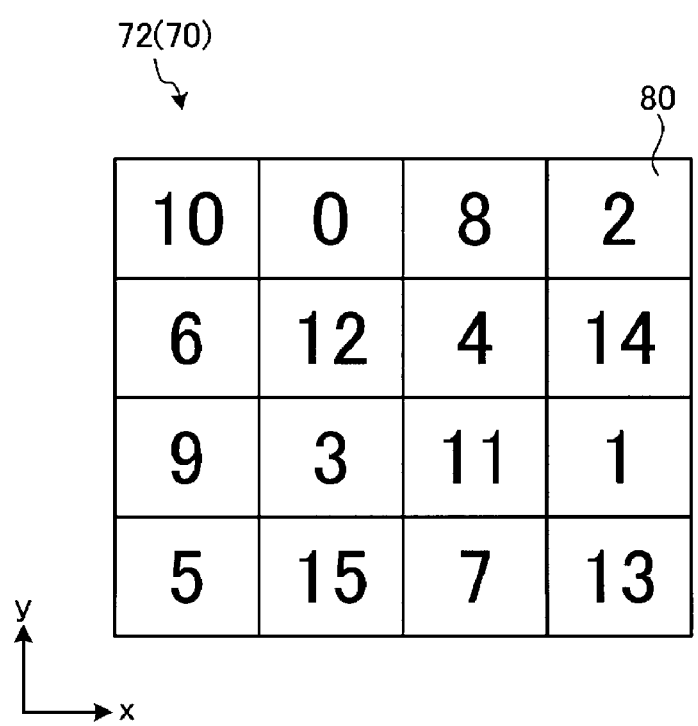
FIG. 6 is an explanatory view of a deformed matrix with respect to the dither matrix shown in FIG. 5.
Figure 7:
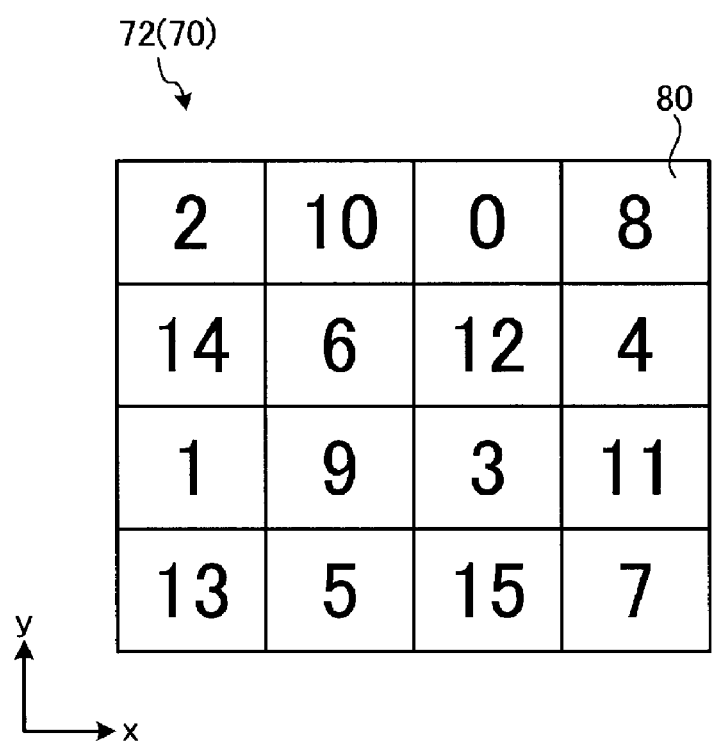
FIG. 7 is an explanatory view of the deformed matrix with respect to the dither matrix shown in FIG. 5.

FIGS. 6 and 7 are explanatory views of the deformed matrix with respect to the dither matrix shown in FIG. 5. The dither matrix 70 assumes the dither matrix 70 generated to represent the intermediate color as the reference matrix 71, and generates the deformed matrix 72 by parallel-moving the pattern position in one axis direction with respect to the reference matrix 71 and forming the deformed pattern. For example, in cases where the direction of one axis of the two axes is assumed as the x direction and the direction orthogonal to the x direction is assumed as the y direction, the deformed matrix 72 used for the formation of the layer adjacent to the layer formed using the reference matrix 71 is generated by moving the pattern of the reference matrix 71 by one dot 80 in the x direction (FIG. 6). Furthermore, the deformed matrix 72 used for the formation of the layer adjacent to the layer formed using the deformed matrix 72 is generated by further moving the pattern by one dot 80 in the x direction with respect to the deformed matrix 72 generated by moving the pattern of the reference matrix 71 (FIG. 7).

Also in the case of forming a layer corresponding to the deformed matrix 72 using the deformed matrix 72 generated as above, the threshold value is set according to the color desired to be represented with respect to the number denoted on the deformed matrix 72, similar to the case of forming the layer using the dither matrix 70. The threshold value and the number of each dot 80 of the deformed matrix 72 are compared to determine whether or not to discharge the colored ink for every dot 80, and then the ink is discharged. The layer corresponding to the deformed matrix 72 is thereby formed while representing the intermediate color using the deformed matrix 72.

Figure 8:
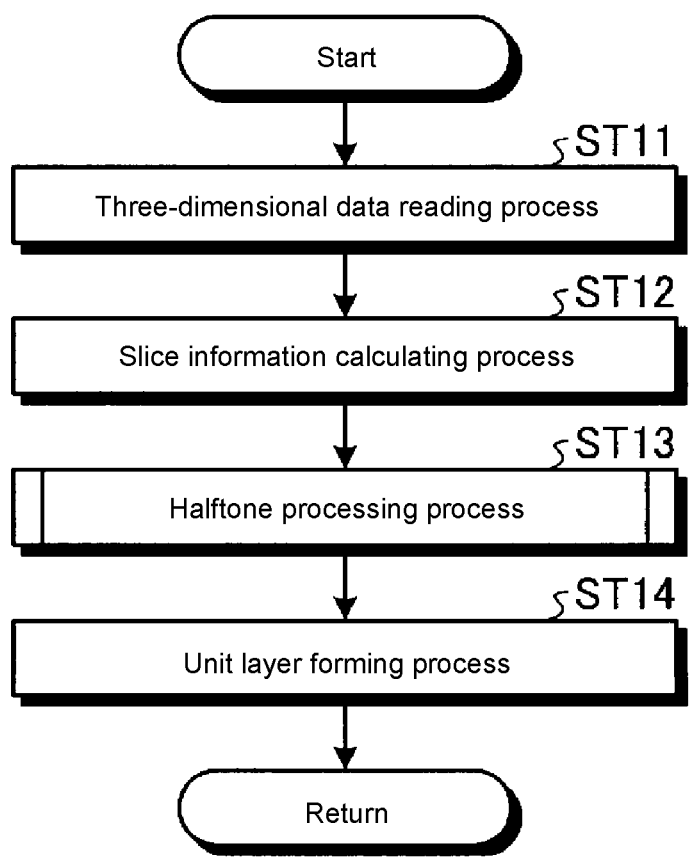
FIG. 8 is a flowchart showing a processing procedure for carrying out the coloring on the three-dimensional object.

Next, a processing procedure for carrying out coloring on the three-dimensional object 5 using the dither matrix 70 in such manner will now be described. FIG. 8 is a flowchart showing a processing procedure for carrying out the coloring on the three-dimensional object. In the case of shaping the three-dimensional object 5 by overlapping a plurality of layers with the three-dimensional object shaping device 10, a reading process of the three-dimensional data 60 is first carried out (step ST11). The three-dimensional data 60 is acquired by the controller 20 from an external device (not shown) such as a personal computer, an external storage device, and the like.

Figure 9:
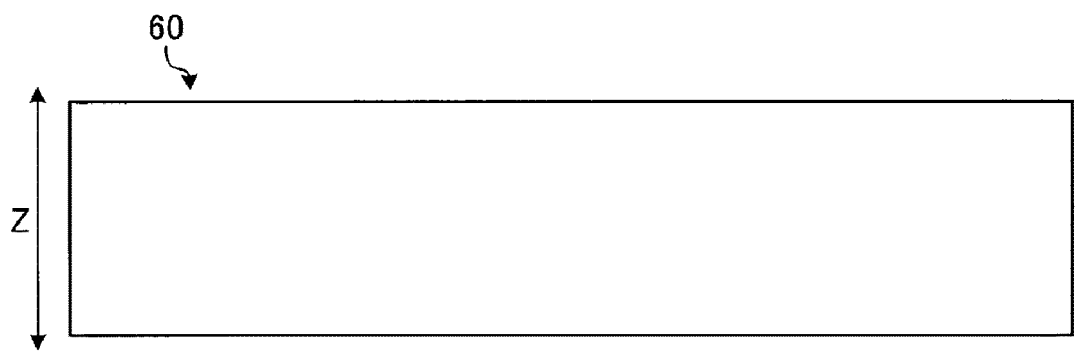
FIG. 9 is a detailed view of the main part of the three-dimensional data for calculating the cross-sectional slice information.
Figure 10:
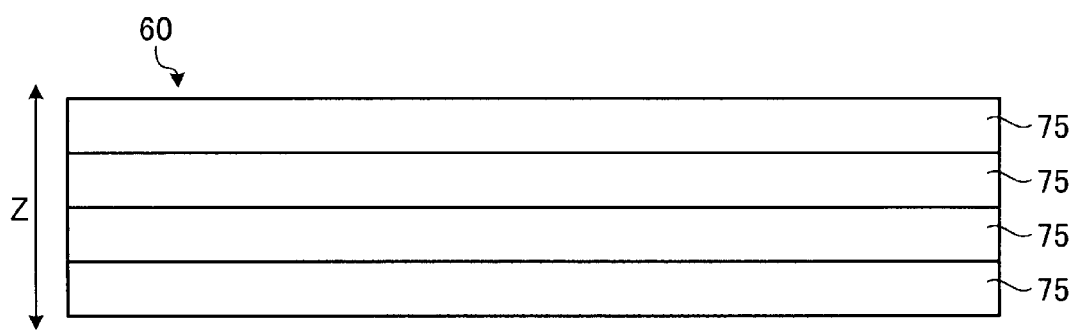
FIG. 10 is an explanatory view in calculating the cross-sectional slice information from the three-dimensional data shown in FIG. 9.

After the three-dimensional data 60 is read, a slice information calculating process of calculating a plurality of pieces of cross-sectional slice information 75 from the three-dimensional data 60 is then carried out (step ST12). FIG. 9 is a detailed view of the main part of the three-dimensional data for calculating the cross-sectional slice information. FIG. 10 is an explanatory view in calculating the cross-sectional slice information from the three-dimensional data shown in FIG. 9. In the slice information calculating process, the three-dimensional data 60 is sliced in a direction of dividing in a height direction Z in shaping the three-dimensional object 5 with the three-dimensional object shaping device 10 based on the three-dimensional data 60. The plurality of pieces of cross-sectional slice information 75 are thereby calculated. The plurality of pieces of cross-sectional slice information 75 calculated in such manner each corresponds to a unit layer 90 (see FIG. 12) in shaping the three-dimensional object 5 by layering a plurality of layers with the three-dimensional object shaping device 10.

The three-dimensional data 60 includes color data of each site of the three-dimensional object 5 to shape, and thus the cross-sectional slice information 75 calculated from the three-dimensional data 60 also includes the color data. The plurality of pieces of cross-sectional slice information 75 include position information corresponding to the position in the layering direction of the unit layer 90. In other words, each piece of cross-sectional slice information 75 includes position information indicating a layer level of the unit layer 90 in the layering direction (Z direction).

Next, a halftone processing process is carried out (step ST13). In the halftone processing process, the halftone process is carried out using the dither matrix 70 on at least one part of the color data with respect to each layer of the plurality of pieces of cross-sectional slice information 75. That is, the dithering is carried out such that the color data of the cross-sectional slice information 75 can be represented by the colored ink used in the three-dimensional object shaping device 10. The halftone processing process is executed by invoking a sub-routine of the halftone processing process.

Figure 11:
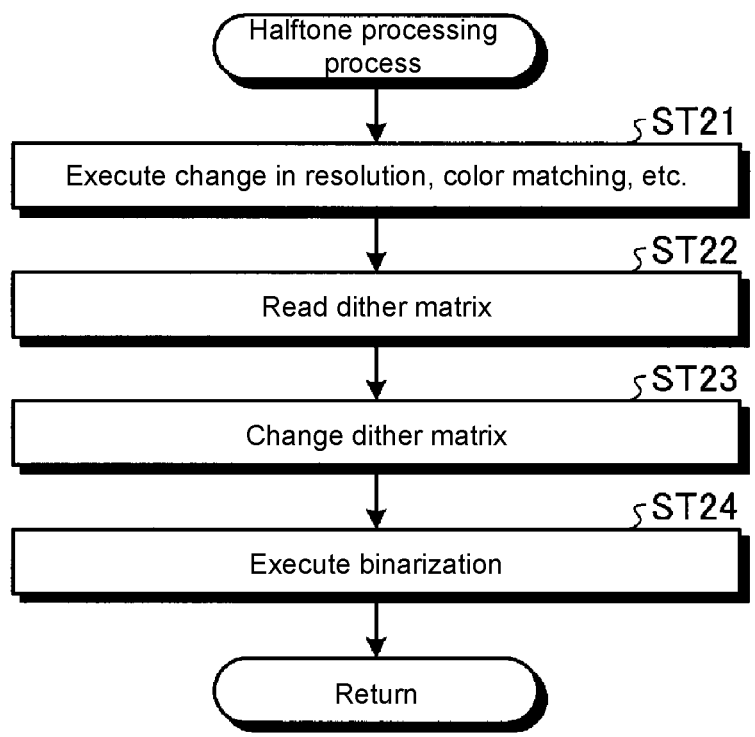
FIG. 11 is a flowchart showing a processing procedure of a halftone processing process.

FIG. 11 is a flowchart showing a processing procedure of the halftone processing process. In the halftone processing process, change in resolution, color matching, and the like are first executed (step ST21). That is, first, the resolution of the data of the portion to perform the halftone process in the cross-sectional slice information 75 is changed in accordance with the resolution of the dither matrix 70 used in the halftone process. Furthermore, the density of each colored ink for representing the color of such color data is determined based on the color data included in the cross-sectional slice information 75.

Next, the reading of the dither matrix 70 is carried out (step ST22). The dither matrix 70 is set in advance as the data for carrying out the halftone process, and stored in the storage unit such as the RAM and the ROM of the controller 20, and the controller 20 carries out the reading of the dither matrix 70 from the storage unit. The dither matrix 70 read in such manner is used as the reference matrix 71.

Next, the dither matrix 70 is changed (step ST23). That is, the pattern of the dither matrix 70 used to perform the halftone process on an arbitrary piece of cross-sectional slice information 75 of the plurality of pieces of cross-sectional slice information 75 is changed with respect to the reference matrix 71 to generate the deformed matrix 72. Thus, in the halftone processing process, the halftone process is carried out such that the patterns of the dither matrix 70 used with respect to at least two of the plurality of pieces of cross-sectional slice information 75 are different.

Specifically, the deformed matrix 72 is generated so that the pattern of the dither matrix 70 used for the adjacent cross-sectional slice information 75 of the plurality of pieces of cross-sectional slice information 75 is different. In other words, the pattern is differed with respect to the reference matrix 71 between the deformed matrixes 72 used for the adjacent cross-sectional slice information 75. For example, in the case of generating the deformed matrix 72 by moving the pattern of the reference matrix 71 in the x direction, the number of dots 80 in moving the pattern of the reference matrix 71 is differed according to the position information of the cross-sectional slice information 75. In other words, the deformed matrix 72 has a predetermined amount in moving the pattern position determined according to the position information. The patterns of the deformed matrixes 72 used for the adjacent cross-sectional slice information 75 are thereby differed.

Next, binarization is executed (step ST24). That is, the binarization is executed with respect to the cross-sectional slice information 75 using the threshold value set according to the color data of the cross-sectional slice information 75, or using the reference matrix 71 or the deformed matrix 72 corresponding to the cross-sectional slice information 75. Thus, at the time of shaping the three-dimensional object 5, whether or not to discharge the colored ink is determined for every position of the dot 80 of the dither matrix 70 corresponding to the cross-sectional slice information 75. After the binarization is executed, the process exits the sub-routine of the halftone processing process and returns to the original flow.

Such halftone processing processes are carried out for every color of the colored ink used for the shaping of the three-dimensional object 5, the reference matrix 71 and the deformed matrix 72 are generated for every color of the colored ink, and the binarization is executed with respect to the cross-sectional slice information 75.

Figure 12:
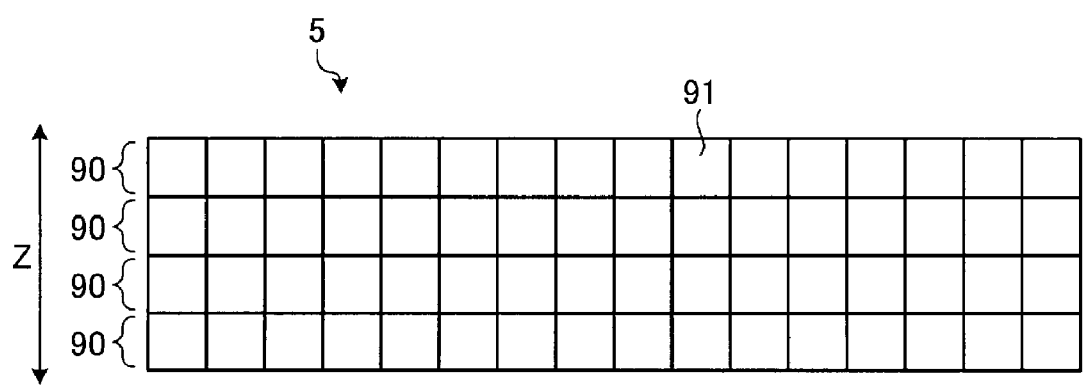
FIG. 12 is an explanatory view of a unit layer.

After returning to the original flow, a unit layer forming process is carried out (step ST14). In this unit layer forming process, the unit layer 90 is formed based on the cross-sectional slice information 75 subjected to the halftone process. FIG. 12 is an explanatory view of the unit layer. When shaping the three-dimensional object 5, the controller 20 controls the main scanning driver 14 to discharge the ink from the discharger 12 toward the working surface 18 based on each piece of cross-sectional slice information 75 while relatively moving the discharger 12 and the working surface 18. The unit layer 90 corresponding to the cross-sectional slice information 75 is thereby formed. In other words, in the halftone processing process, the ink is discharged from the discharger 12 toward the working surface 18 based on discharge/non-discharge of the colored ink determined for every position of the dot 80 of the dither matrix 70 in the cross-sectional slice information 75. In this case, the ink of each color is discharged from the discharger 12 based on the cross-sectional slice information 75 in which the binarization is carried out for every color of the colored ink. The clear ink is discharged to the position where the colored ink is not discharged.

According to such inks, each dot 91 configuring the unit layer 90 is formed with the ink based on the cross-sectional slice information 75 subjected to the halftone process, and such dots 91 are combined to form the unit layer 90. The unit layer 90 is formed using the colored ink of one or more colors.

One unit layer 90 is formed in such manner, and the unit layer 90 of the number of cross-sectional slice information 75 is layered by executing the halftone processing process (step ST13) and the unit layer forming process (step ST14) by the number of cross-sectional slice information 75 calculated in the slice information calculating process (step ST12). In this case, in each halftone processing process (step ST13), the movement amount in moving the pattern with respect to the reference matrix 71 in the deformed matrix 72 is stored in the storage unit of the controller 20, and when the dither matrix 70 (step ST23) is changed in the next halftone processing process, the pattern is moved by the movement amount different from the movement amount stored in the storage unit to generate the deformed matrix 72. Accordingly, a plurality of unit layers 90, in which the colored patterns of the dots 91 configuring the unit layer 90 differ, are layered to shape the three-dimensional object 5.

The three-dimensional object shaping method according to the embodiment above applies at least two or more different patterns to a plurality of dither matrixes 70 with respect to the plurality of pieces of cross-sectional slice information 75, and thus can disperse the landing position of an arbitrary colored ink at the time of layering the unit layer 90 formed by curing the ink. Thus, a specific color can be suppressed from needlessly standing out, and the surface image quality of the three-dimensional object 5 formed by curing the colored ink can be enhanced to the same extent as the two-dimensional printed matter. As a result, the surface image quality of the three-dimensional object 5 can be brought closer to the three-dimensional data 60.

Furthermore, even if the thickness of the colored layer located on the surface of the three-dimensional object 5 is thin, the desired color representation can be carried out with changes made to the landing position of the colored ink in each unit layer 90 even in the thin colored layer by providing the color gradation in representing the color using the dither matrix 70 in multiple stages. Thus, the surface image quality of the three-dimensional object 5 can be brought closer to the three-dimensional data 60 even if the thickness of the colored layer is thin.

Moreover, since the halftone process is carried out such that the patterns of the dither matrixes 70 used for the adjacent cross-sectional slice information 75 are different, the successive landing of the ink of the same color to the same position can be more reliably prevented at the time of forming the unit layer 90. As a result, the surface image quality of the three-dimensional object 5 can be more reliably enhanced.

Furthermore, since the pattern of the dither matrix 70 is parallel-moved by a predetermined amount with respect to the reference pattern according to the position in the layering direction of the unit layer 90 to generate the deformed matrix 72, the landing position of the ink of the same color can be efficiently dispersed in the successive unit layers 90. As a result, the surface image quality of the three-dimensional object 5 can be more reliably enhanced.

Furthermore, the three-dimensional object shaping device 10 according to the above embodiment applies at least two or more different patterns to the plurality of dither matrixes 70 with respect to the plurality of pieces of cross-sectional slice information 75, and thus can disperse the landing position of an arbitrary colored ink when forming and layering the unit layer 90. Thus, the specific color can be suppressed from standing out, and the surface image quality of the three-dimensional object 5 can be enhanced to the same extent as the two-dimensional printed matter. As a result, the surface image quality of the three-dimensional object 5 can be brought closer to the three-dimensional data 60.

Modified Examples

In the embodiment described above, the halftone process is carried out irrespective of the color of the ink in the halftone processing process, but the halftone process may not be carried out with respect to the inks of all the colors. The color data included in the three-dimensional data 60 also includes information on the density of the color, and thus the halftone process may be carried out using the deformed matrix 72 with respect to the color data in which the density of the color is the lowest of the color data in the halftone processing process. That is, in the case of a color with low density, the number of landings of the ink of the relevant color reduces, and hence the granular feeling of the relevant color may stand out when the ink is landed at the same position at the time of discharging the ink. Thus, the effect of enhancing the surface image quality of the three-dimensional object 5 can be enhanced by carrying out the halftone process on the color data of low density.

Figure 13:
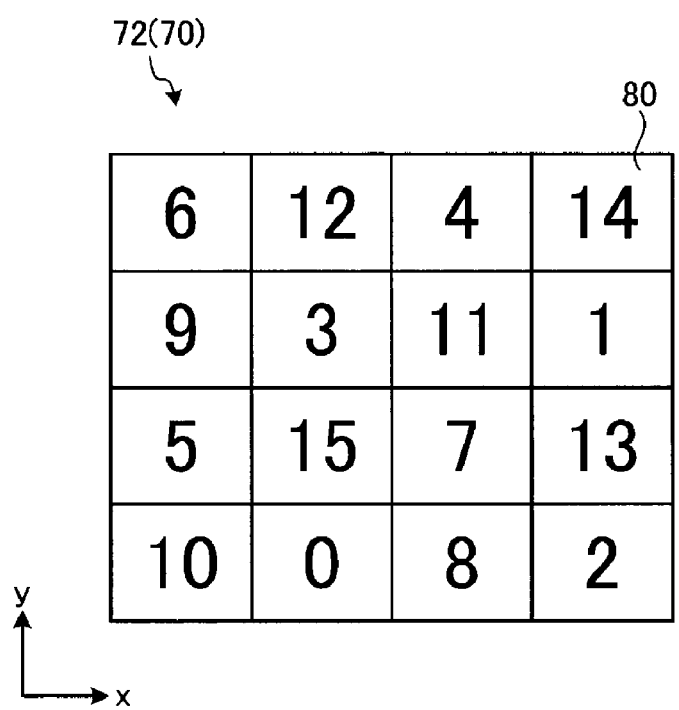
FIG. 13 is a modified example of the three-dimensional object shaping method according to the embodiment, and is an explanatory view of the deformed matrix in the case of moving the pattern in the direction of two axes with respect to the dither matrix shown in FIG. 5.
Figure 14:
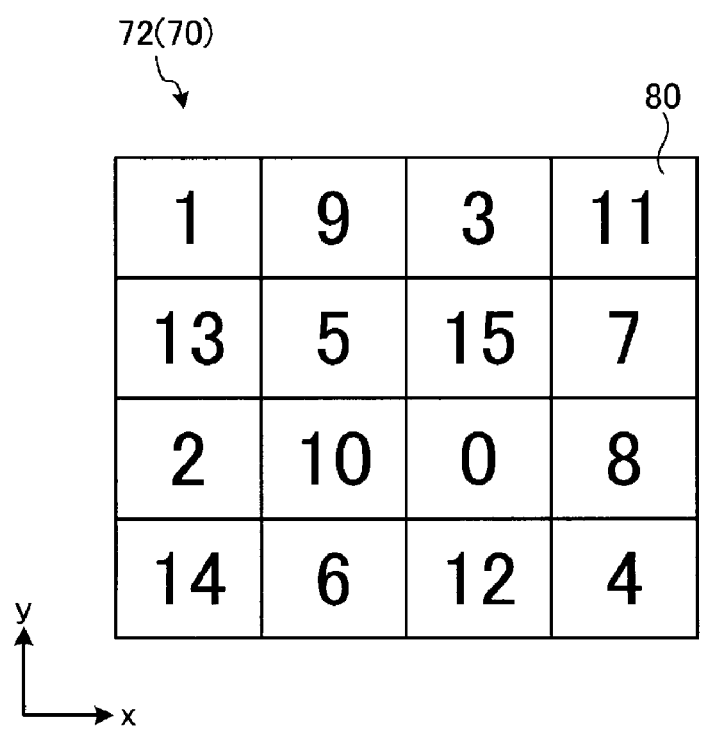
FIG. 14 is a modified example of the three-dimensional object shaping method according to the embodiment, and is an explanatory view of the deformed matrix in the case of moving the pattern in the direction of two axes with respect to the dither matrix shown in FIG. 5.

Furthermore, in the three-dimensional object shaping method according to the embodiment, the deformed matrix 72 is generated by moving the pattern of the reference matrix 71 or the pattern of the deformed matrix 72 of the adjacent layer by one dot 80 in the x direction, but the deformed matrix 72 may be generated through other methods. FIGS. 13 and 14 are modified examples of the three-dimensional object shaping method according to the embodiment, and are explanatory views of the deformed matrix in the case of moving the pattern in the direction of two axes with respect to the dither matrix shown in FIG. 5. For example, as shown in FIG. 13, the deformed matrix 72 may be generated by moving the pattern in the direction of two axes by one dot 80 in the x direction and one dot 80 in the y direction with respect to the pattern of the reference matrix 71. Furthermore, as shown in FIG. 14, the deformed matrix 72 used for the formation of the layer adjacent to the layer formed using the deformed matrix 72 may be generated by further moving the pattern by one dot 80 in the x direction and one dot 80 in the y direction with respect to the deformed matrix 72 generated by moving the pattern of the reference matrix 71.

Figure 15:
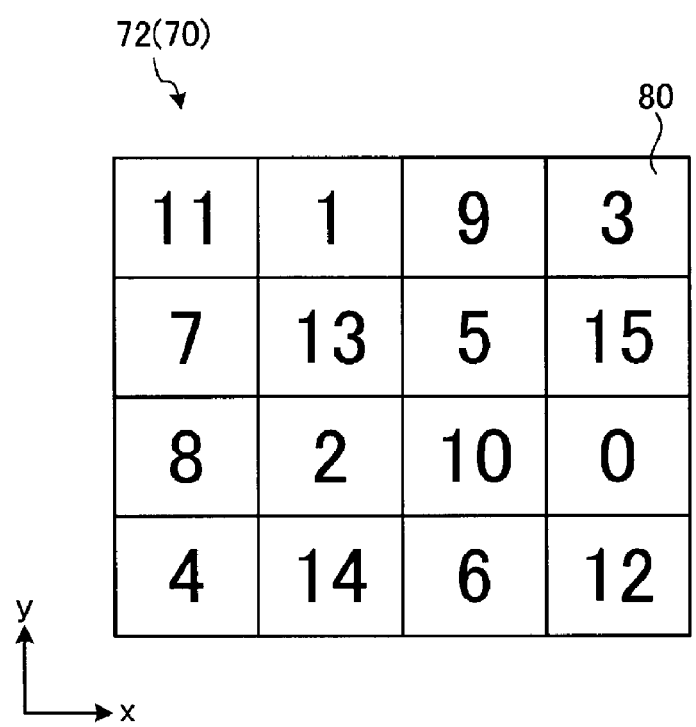
FIG. 15 is a modified example of the three-dimensional object shaping method according to the embodiment, and is an explanatory view of the deformed matrix in the case of moving the pattern by the movement amount of a plurality of dots with respect to the dither matrix shown in FIG. 5.
Figure 16:
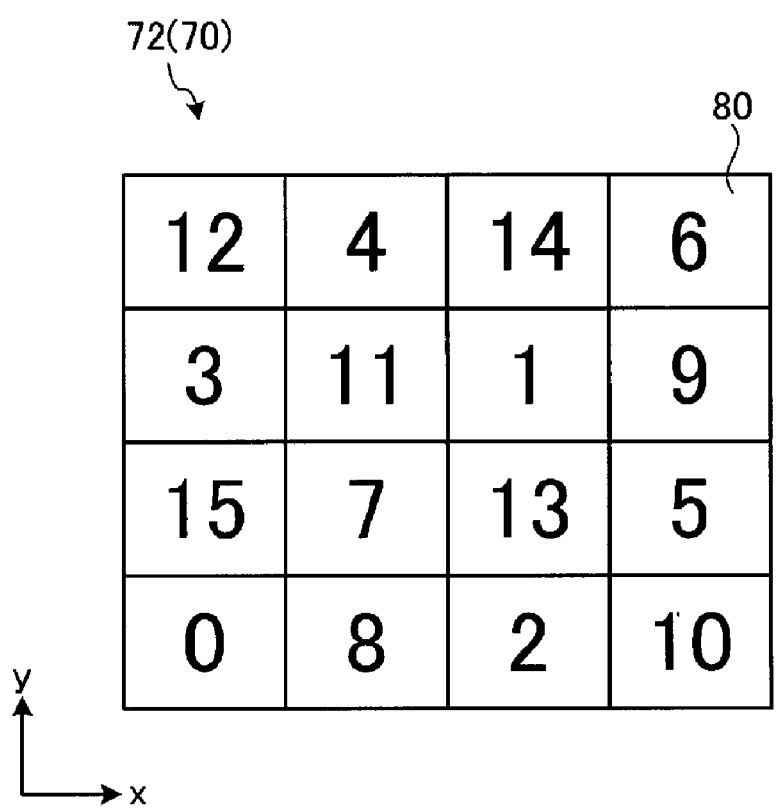
FIG. 16 is a modified example of the three-dimensional object shaping method according to the embodiment, and is an explanatory view of the deformed matrix in the case of moving the pattern by the movement amount of a plurality of dots with respect to the dither matrix shown in FIG. 5.

The deformed matrix 72 may be generated by moving the pattern by a movement amount other than by one dot 80. FIGS. 15 and 16 are modified examples of the three-dimensional object shaping method according to the embodiment, and are explanatory views of the deformed matrix in the case of moving the pattern by the movement amount of a plurality of dots with respect to the dither matrix shown in FIG. 5. For example, as shown in FIG. 15, the deformed matrix 72 may be generated by moving the pattern by the movement amount of three dots 80 in the x direction and two dots 80 in the y direction with respect to the pattern of the reference matrix 71. Furthermore, as shown in FIG. 16, the deformed matrix 72 used for the formation of the layer adjacent to the layer formed using the deformed matrix 72 may be generated by further moving the pattern by one dot 80 in the x direction and three dots 80 in the y direction with respect to the deformed matrix 72 generated by moving the pattern of the reference matrix 71. Thus, the landing positions of the ink of the same color can be more reliably dispersed in the successive unit layers 90, and the surface image quality of the three-dimensional object 5 can be more reliably enhanced by setting the moving direction of the pattern of the dither matrix 70 to a plurality of directions, and the movement amount to a plurality of dots 80.

In the embodiment described above, the unit layer 90 is formed after carrying out the halftone process on the cross-sectional slice information 75 for forming the predetermined unit layer 90, and the unit layer 90 is formed after carrying out the halftone process on the cross-sectional slice information 75 for forming the unit layer 90 adjacent to the relevant unit layer 90, but the shaping of the three-dimensional object 5 may be carried out through other procedures. For example, all the unit layers 90 may be formed after carrying out the halftone process with respect to all of the plurality of pieces of cross-sectional slice information 75 used for the formation of the unit layers 90 to layer. Alternatively, a plurality of groups may be set with a plurality of unit layers 90 as one group, and the halftone processing process and the unit layer forming process may be carried out for every group in order, so that the shaping of the three-dimensional object 5 may be carried out by repeating the layering of the unit layer 90 for every group.

What is claimed is:

1. A three-dimensional object shaping method for shaping a three-dimensional object by layering a unit layer formed using a coloring material of one or more colors, the three-dimensional object shaping method comprising:

a slice information calculating process of calculating a plurality of pieces of cross-sectional slice information from three-dimensional data including color data;

a halftone processing process of carrying out a halftone process using a dither matrix on at least one part of the color data with respect to each layer of the plurality of pieces of cross-sectional slice information, and carrying out the halftone process so that a pattern of the dither matrix used with respect to at least two of the plurality of pieces of cross-sectional slice information differs; and a unit layer forming process of foiling the unit layer based on the cross-sectional slice information subjected to the halftone process, wherein the unit layer is formed by discharging the coloring material only to necessary dots according to a color tone to be expressed and discharging a transparent material to other dots except for the necessary dots, so as to fill all of the necessary dots and the other dots.

2. The three-dimensional object shaping method according to claim 1, wherein in the halftone processing process, the halftone process is carried out so that patterns of the dither matrix used for the cross-sectional slice information adjacent in a layering direction of the plurality of pieces of cross-sectional slice information are different.

3. The three-dimensional object shaping method according to claim 1, wherein the plurality of pieces of cross-sectional slice information include position information corresponding to a position in a layering direction of the unit layer;

the dither matrix is configured of a matrix of two axes, the dither matrix including:
a reference matrix having a reference pattern to become a reference of the pattern of the dither matrix, and
a deformed matrix having a deformed pattern formed by parallel-moving a pattern position by a predetermined amount in at least one axis direction of the two axes with respect to the reference pattern; and
the deformed matrix has the predetermined amount determined according to the position information.

4. The three-dimensional object shaping method according to claim 2, wherein the plurality of pieces of cross-sectional slice information include position information corresponding to a position in a layering direction of the unit layer;

the dither matrix is configured of a matrix of two axes, the dither matrix including:
a reference matrix having a reference pattern to become a reference of the pattern of the dither matrix, and
a deformed matrix having a deformed pattern formed by parallel-moving a pattern position by a predetermined amount in at least one axis direction of the two axes with respect to the reference pattern; and
the deformed matrix has the predetermined amount determined according to the position information.

5. The three-dimensional object shaping method according to claim 1, wherein the color data includes information on a density of a color; and in the halftone processing process, the halftone process is carried out on the color data in which a density of a color is the lowest of the color data.

6. The three-dimensional object shaping method according to claim 2, wherein the color data includes information on a density of a color; and in the halftone processing process, the halftone process is carried out on the color data in which a density of a color is the lowest of the color data.

7. The three-dimensional object shaping method according to claim 3, wherein the color data includes information on a density of a color; and
   in the halftone processing process, the halftone process is carried out on the color data in which a density of a color is the lowest of the color data.

8. The three-dimensional object shaping method according to claim 4, wherein the color data includes information on a density of a color; and
   in the halftone processing process, the halftone process is carried out on the color data in which a density of a color is the lowest of the color data.

9. A three-dimensional object shaping device that shapes a three-dimensional object by layering a unit layer formed using a coloring material of one or more colors based on three-dimensional data including color data, the three-dimensional object shaping device comprising:
   a discharger for discharging a liquid droplet to a working surface, the discharger including a plurality of nozzles that discharge a liquid droplet for shaping the three-dimensional object;
   a relative mover for relatively moving the discharger and the working surface in at least one of a main scanning direction or a sub-scanning direction; and
   a control device for controlling operations of the discharger and the relative mover; wherein
   the control device calculates a plurality of pieces of cross-sectional slice information to use for formation of the unit layer based on the three-dimensional data, carries out a halftone process using a dither matrix on at least one part of the color data with respect to each layer of the plurality of pieces of cross-sectional slice information, carries out the halftone process of the color data so that a pattern of the dither matrix used with respect to at least two of the plurality of pieces of cross-sectional slice information differs, and controls the discharger and the relative mover to form the unit layer based on the cross-sectional slice information subjected to the halftone process,
   wherein the control device is configured to perform a control of forming the unit layer by discharging the coloring material only to necessary dots according to a color tone to be expressed, and discharging a transparent material to other dots except for the necessary dots, so as to fill all of the necessary dots and the other dots.

10. The three-dimensional object shaping method according to claim 1, further comprising:
    providing a flattening roller,
    wherein a shaping is performed while a flattening of the unit layer being shaped is repeated by the flattening roller.

11. The three-dimensional object shaping method according to claim 1, wherein
    in the halftone processing process, the color data of the coloring material located on a surface of the three-dimensional object is made to have a color gradation in multiple stages than the color data of other coloring material. subjected to the halftone process.

* * * * *